IMPULSE REGENERATOR USING ELECTRONIC DETECTION

Original Filed Dec. 12, 1958 2 Sheets-Sheet 1

INVENTOR.
ALFRED H. FAULKNER
BY
C. A. Gulbrandsen
ATTY.

IMPULSE REGENERATOR USING ELECTRONIC DETECTION

Original Filed Dec. 12, 1958 2 Sheets-Sheet 2

INVENTOR.
ALFRED H. FAULKNER

BY C. A. Gulbrandsen
ATTY.

United States Patent Office 3,278,908

Patented Oct. 11, 1966

3,278,908

IMPULSE REGENERATOR USING ELECTRONIC DETECTION

Alfred H. Faulkner, Redondo Beach, Calif., assignor to Automatic Electric Laboratories, Inc., Northlake, Ill., a corporation of Delaware Original application Dec. 12, 1958, Ser. No. 780,125, now Patent No. 3,114,051, dated Dec. 10, 1963. Divided and this application Dec. 10, 1962, Ser. No. 243,415
6 Claims. (Cl. 340—173)

This invention relates in general to impulse regenerators and in particular to impulse regenerators of the type utilizing electronic means for detecting the stored digital information. This application is a division of copending application Serial No. 780,125, filed December 12, 1958, issued December 10, 1963 as U.S. Patent No. 3,114,051.

In the telephone art it is often necessary to correct dial pulses as to their amplitude, wave shape, or both. Pulse repeaters are generally used to accomplish this purpose, and, since a new pulse is transmitted as each dial pulse is received, it is unnecessary to have digit storage facilities.

An impulse regenerator, however, not only corrects for pulse wave form and amplitude distortion but also compensates for frequency deviation of the incoming pulse train. Assuming that a frequency of 10 p.p.s. is desirable for existing switching facilities and that incoming dial pulse frequency may range between 8 p.p.s. and 12 p.p.s., it is at once apparent that a new pulse cannot be generated upon reception of each of the old pulses if the desired 10 p.p.s. frequency is to be attained. Therefore, it is necessary to provide some means for storing the incoming impulses before beginning transmission of outgoing impulses.

Impulse regenerators of the prior art utilized a variety of elements as storage devices. Among these were relays and rotary switches. Capacitors were also employed, but since sensitive detecting means were not used, the storage system generally proved expensive and bulky. Applicant's electronic detecting circuit makes it feasible to use small inexpensive components, such as small capacitors and magnetic cores, as storage elements in impulse regenerators.

Accordingly, it is an object of this invention to provide an impulse regenerator, compatible with existing telephone switching facilities, which utilizes small inexpensive components such as, electrolytic capacitors and magnetic cores, as storage elements.

Another object is to provide a novel electronic type detecting circuit for detecting the potential on marked ones of a group of small storage capacitors.

A further object of this invention is to provide a novel electronic type detecting circuit for detecting the direction of saturation in a magnetic core.

A feature of this invention is the use of an electronic pulse amplifying circuit in an impulse regenerator which permits the use of a common, low powered, electronic source of accurately timed voltage pulses for controlling the regenerator output pulse frequency.

Other objects and features of the invention will be apparent from a reading of the specification taken in conjunction with the drawings in which.

Figure 1:
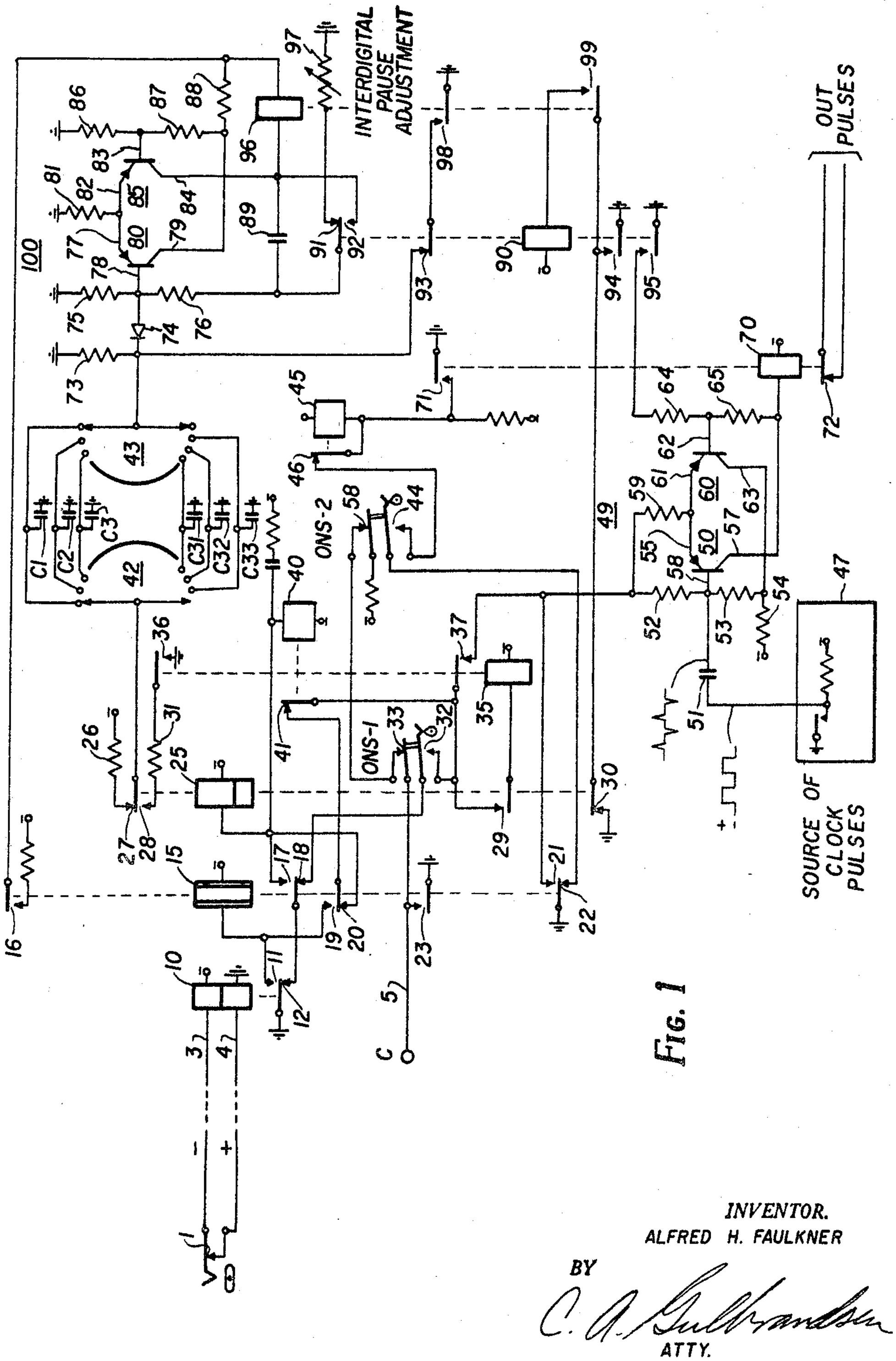
FIG. 1 is a schematic representation of an impulse regenerator utilizing small electrolytic capacitors as storage elements.

Referring now to FIG. 1 of the drawings, a brief description of the operation of this impulse regenerator, which uses capacitor storage, will be given. The regenerator is seized and held in a conventional manner. As digital impulses are received from the preceding equipment, the wiper of a rotary switch 42 is stepped, in synchronism with the received impulses, across a series of individual storage capacitors C1–C33. During each interdigital pause between impulse series a marking circuit is completed through the rotary switch wiper to the capacitor then in contact with the wiper. The charging of the capacitor indicates the digit registration. Succeeding digits are stored in a similar manner.

At the time of seizure, operating potentials are applied to a transistorized detecting circuit 100 and to a transistorized pulse amplifying circuit 49. Detecting circuit 100 is connected at this time for monostable operation. The base electrode of one of the detecting circuit transistors 80 is connected to the switch wiper of another rotary switch 43, the bank contacts of which are also connected to the individual storage capacitors. The normally "off" transistor 80 is rendered conductively due to a base potential applied from battery over the wipers and first bank contacts of both of the switches. Upon receipt of the first digital impulse this base potential is removed and the detecting circuit assumes its stable condition. When this condition has been reached, a circuit, which will be completed during the first interdigital pause period, is prepared for rendering the monostable detecting circuit 100 bistable, and for operating the pulse amplifier 49.

A common pulse generator or source of clock pulses 47 is connected through a differentiating capacitor to the base of the normally "off" transistor 50 of the pulse amplifier, which transistor has an output pulsing relay 70 connected in its collector circuit. The differentiating capacitor acts to convert the square wave voltage output from the common pulse generator into a series of positive and negative voltage pips. The positive voltage pips generate small pulses of collector current in the "off" transistor, but these pulses are insufficient to operate the pulsing relay.

During the interdigital pause after the receipt of the first digit, an aforementioned circuit is completed which renders the detecting circuit 100 bistable, and connects a ground potential to the base of the "on" transistor 60 in the pulse amplifier 49. Now, the next positive voltage pip to the base of the "off" transistor of the pulse amplifier switches the "on" transistor "off" and locks the previously "off" transistor "on." The collector current is now sufficient to operate the pulsing relay 70. The pulsing relay, in addition to transmitting output pulses, also causes the motor magnet 45 of the second switch 43 to operate. Upon restoration of the pulsing relay, the motor magnet restores and steps the switch wiper to the next contact. This process is repeated until the switch wiper of the second switch 43 rests on its bank contact associated with the marked capacitor. The charge on the marked capacitor is impressed on the base of the non-conducting transistor 80 of the detecting circuit 100, which, it will be remembered, is now bistable and causes this transistor to be switched "on." The change in state of the detecting circuit causes it to revert to monostable operation. The pulse amplifier 49, in response to the detecting circuit, also reverts terminating the operation of the output pulsing relay and the stepping of the second switch.

When the detecting circuit 100 is switched by the application of the charge of the marked capacitor to the base of its non-conducting transistor 80, an erasing circuit is closed which neutralizes the charge on the marked capacitor. The now monostable detecting circuit is in an unstable state and will remain so if another digit has not been received. If another digit has been stored or is in the process of being stored, then the base battery potential necessary to hold the detecting circuit in its unstable state will not be present and it will assume its stable condition. Usually a second digit will either have been stored or be in the process of being stored and the time required for the detecting circuit to switch from its unstable to its stable condition will determine the pause period between the output impulse series. When the detecting circuit reaches its stable state, it is again immediately converted for bistable operation and the above processes are repeated.

A detailed explanation of the operation of the circuit of FIG. 1 will now be given. The regenerator is marked idle to other switches by battery impressed on lead 5 via off-normal spring contacts 58 and 33. The switch is seized in a well known manner and a loop circuit is closed to operate relay 10. Relay 10 in operating closes, at contact 11, an operating path for relay 15. Relay 15 in operating prepares, at contact 17, operating paths for relay 25, motor magnet 40 and relay 35. At contact 16 battery potential is connected to the detecting circuit 100, comprising transistors 80 and 85, and at contact 21 ground potential is conneced to the pulse amplifier circuit 49, comprising transistors 50 and 60. At contact 23 ground is connected to lead 5 to mark the regenerator "busy" to other switches.

For the sake of clarity the process of storing an incoming digit will be discussed before analyzing the effects of the aforementioned potentials on the detecting and pulse amplifying circuits. Assume that the digit "2" is dialed by the subscriber. On the return of the dial, contact 1 of the subscriber's subset opens (for the first time) and relay 10 restores. Relay 10 in restoring completes, at contact 12, obvious operating paths for relay 25 and motor magnet 40. Rotary switch 42 is the type that steps upon restoration of its motor magnet and consequently no stepping occurs at this time. Relay 25 in operating removes, at its contact 27, battery potential from the switch wiper of switch 42 and prepares, at its contact 28, to place ground potential thereon. At contact 29, an operating path is prepared for relay 35.

As the dial of the subscriber's telephone continues moving toward its normal position, contact 1 recloses and relay 10 is reoperated. The operating path to relay 15 is again completed, helping to maintain this relay, which is slow-to-release, operated during the open periods of contact 1. At contact 12 the operating path to motor magnet 40 is broken. Motor magnet 40, in restoring, causes the switch wiper of switch 42 to step to the next bank contact and, due to the reclosure of its interrupter spring contact 41, an operating path to relay 35 is completed. This path is as follows: battery, relay 35, contact 29 of relay 25, which also remains operated during the open period of contact 1 due to its slow-to-release feature, interrupter spring contact 41, contact 19, contact 11, and ground. Relay 35 locks to ground via contact 21, its contact 37, and contact 29. At contact 36 a ground circuit is completed to the wiper of switch 42. When switch 42 was stepped, its off-normal spring contacts 32 and 33 restored, but these operations have no significance at this time.

The storage elements in this regenerator are small individual electrolytic capacitors, C1 to C33 connected between ground and the paralleled bank contacts of switches 42 and 43. For the purposes of clarity, only a few of these capacitors are shown. The ground which has been connected to the wiper of switch 42 is now effective to neutralize any charge present on capacitor C2.

The subscriber's dial opens the line loop at contact 1 for the second time and relay 10 restores. Motor magnet 40 reoperates, and its interrupter spring contact 41 opens the original operating path to relay 35, but this relay remains operated over the holding path previously described. Relay 25 is energized again to help keep it operated during the open periods of contact 1. Contact 1 now closes and remains closed during the interdigital pause period and relay 10 reoperates. Motor magnet 40 is de-energized and the wiper of switch 42 steps to its third bank contact. After a brief delay relay 25 restores, and at contact 29 restores relay 35. Relay 35 in restoring further opens, at its contacts 36, the open ground circuit to the switch wiper of switch 42. This relay is incorporated in the circuit to guard against the accidental discharge of a marked capacitor when a subsequent digit is received. Relay 25 in restoring also reconnects, at its contact 27, resistance battery to the switch wiper of switch 42 which is now connected to capacitor C3. Capacitor C3 charges over this path which consists of battery, resistance 26, contact 27, the switch wiper of switch 42, capacitor C3, and ground. Relay 25 also connects ground at its contact 30 to relay 90 which, as will be shown presently, will complete an operating path to relay 90.

Returning now to a time just prior to seizure of the regenerator, it will be noted that transistor 80 of detecting circuit 100 is conductive along its emitter-base path. This path is as follows: ground, resistance 81, emitter 77 and base 78 of transistor 80, diode 74, the switch wiper of switch 43 which is resting on its first bank contact, the junction wire interconnecting the first bank contacts of switches 42 and 43, the switch wiper of switch 42, contact 27, resistance 26, and negative battery.

Upon seizure, closure of contact 16 renders transistor 80 conductive along its emitter-collector path as follows: ground, resistance 81, emitter 77 of transistor 80, collector 79, resistance 88, contact 16, and resistance battery. Emitter 77 of transistor 80 is connected to emitter 82 of transistor 85, hence there can be no potential difference between them. As transistor 80 conducts along its emitter-collector path, its emitter 77 is rendered less positive due to the potential drop in resistance 81. Consequently, emitter 82 of transistor 85 is rendered less positive and this transistor is prevented from conducting. It will be noted that these transistors are connected for monostable operation since capacitor 89 is connected between base 78 of transistor 80 and collector 84 of transistor 85. However, the arrangement is maintained in an unstable state due to negative battery applied to base 78 of transistor 80 through diode 74.

When relay 25 operates upon receipt of the first incoming digital impulse, it removes this negative potential from the switch wiper of switch 42 and hence from base 78 of transistor 80. As a result the emitter base current of transistor 80 is diverted through resistor 76, capacitor 89, relay 96, contact 16, to negative battery. Capacitor 89 begins to charge and drives base 78 more and more positive which results in transistor 80 being driven to cut-off. As transistor 80 is driven towards its non-conductive state, its emitter potential is raised, allowing transistor 85 to conduct. The emitter-collector current path of transistor 85 is as follows: ground, resistance 81, emitter 82 of transistor 85, collector 84, relay 96, contact 16, and resistance battery. Over this path relay 96 operates.

Relay 96 in operating completes a shunting ground path at contact 98 to capacitor C1, thereby discharging this capacitor. At contact 99 an operating path for relay 90 is prepared, which path is still incomplete at contact 30. When relay 25 restores during the first interdigital pause, this operating path is completed and relay 90 operates and locks. Relay 90 in operating shorts out, at contact 92, capacitor 89 and converts detecting circuit 100 from monostable to bistable operation. Since detecting circuit 100 is now bistable, transistor 80 may be switched on (thus switching transistor 85 off) by application of negative potential to its base 78.

The pulse amplifying circuit 49 comprises a pair of transistors 50 and 60 connected as a multivibrator. A source of timed voltage pulses 47, which may be a pulse generator, preferably an electronic one employing transistors, is connected through a small capacitor 51 to base 56 of transistor 50. Capacitor 51 differentiates the rectangular output wave form of pulse generator 47 to impress a series of alternating voltage pips on the base of transistor 50.

Returning again to seizure, ground is connected via contact 21 to pulse amplifying circuit 49, and since the ground to base 62 of transistor 60 is open at contact 95, transistor 60 conducts. When transistor 60 conducts along its emitter-collector path, its collector 63 swings positive and prevents transistor 50 from conducting. The voltage pips applied to the base of transistor 50 give rise to corresponding brief pulses of collector current in this transistor, but these brief pulses of current are insufficient to operate output pulsing relay 70, which is connected in its collector circuit.

As mentioned previously, relay 25 restores during the interdigital pause period, completing an operating path for relay 90, and relay 90 operates and locks. To repeat, relay 90 in operating shorts out capacitor 89, thus converting the monostable detecting circuit 100 for bistable operation. Under these conditions negative voltage applied to the base of transistor 80 will cause the circuit to switch.

Relay 90 in operating also opens, at its contact 93, the ground circuit to the wiper of switch 43 to preclude the possibility of discharging a marked capacitor. At contact 95 ground is connected via resistor 64 to base 62 of transistor 60.

It will be remembered that voltage pips are continuously applied to base 56 of transistor 50. The spacing of these pips determines the impulse ratio of the outgoing impulses from the regenerator. It will also be recalled that with relay 90 unoperated, the brief pulses of collector current in transistor 50 were insufficient to operate relay 70. However, with relay 90 operated, the brief pulse of collector current in transistor 50 during a positive voltage pip is effective to cut off transistor 60, causing its collector 63 to swing negative and switch transistor 50 on in the usual manner. When transistor 50 locks in its conductive state, relay 70 operates. Relay 70 in operating opens, at contact 72, the outgoing pulse loop, and at contact 71 completes an operating circuit to motor magnet 45.

Transistor 50 remains conductive until a subsequent negative voltage pip drives it to cut off, causing the circuit to revert to its previous state, that is, with transistor 60 conducting. Relay 70 restores, recloses the out-pulsing loop at contact 72, and breaks the circuit to motor magnet 45. Upon the restoration of motor magnet 45 the switch wiper of switch 43 is stepped to its next bank contact. Succeeding positive and negative voltage pips applied to the base of transistor 50 cause relay 70 to operate and restore as previously described and the switch wiper of switch 43 is stepped upon each restoration of relay 70.

Since the first received digit was assumed to be a 2, capacitor C3 was negatively charged. After relay 70 has transmitted two outgoing impulses to the line, the switch wiper or switch 43 engages the bank contact to which capacitor C3 is connected. The negative voltage on capacitor C3 is impressed on base 78 of transistor 80 via the switch wiper of switch 43 and diode 74. This negative potential causes the detecting circuit 100 to switch, rendering transistor 80 conductive and transistor 85 nonconductive. When transistor 85 becomes non-conductive, relay 96 restores and at its contact 99 restores relay 90. Relay 90 in restoring removes, at contact 95, the ground to base 62 of transistor 60. Succeeding voltage pips applied to the base of transistor 50 are again ineffective to operate relay 70 and the transmission of outgoing impulses is terminated.

At this time another digit will ordinarily be stored or be in the process of being stored and the switch wiper of switch 42 will not be resting on its bank contact associated with capacitor C3. Therefore, the detecting circuit 100, in absence of the holding battery on base 78 of transistor 80, will revert to its stable condition, i.e. with transistor 85 conducting. The time required for this switching action to occur will be determined by the charging time of capacitor 89. This capacitor charges through resistors 75 and 76 which are connected in parallel with variable resistance 97. Variable resistance 97 is utilized to permit adjustment of the RC time constant and hence the outgoing interdigital pause period.

If another digit has not as yet been received, the switch wiper of switch 42 would be resting on the bank contact connected to capacitor C3. Relay 25 would be restored and battery would be impressed via resistance 26, contact 27, the switch wiper of switch 42, the junction wire between the third bank contacts of switches 42 and 43, the switch wiper of switch 43, and diode 74 to the base 78 of transistor 80, thus holding this transistor conductive pending receipt of another digit. If another digit has been stored or is in the process of being stored, relay 90 would reoperate during the next incoming interdigital pause period and transmission of output pulses would take place as previously described.

The above procedure is repeated for the remaining incoming digits. When the impulse regenerator has transmitted the corresponding series of output impulses, "switch through" or some other appropriate switching action occurs, breaking the hold path for relay 10. Relay 15, after the passage of its slow-to-release time, restores. The regenerator is not marked idle to other switches since resistance battery is prevented from appearing on control lead 5 due to open off-normal springs 33 and 58. Relay 15 in restoring closes, at contact 18, an operating path to motor magnet 40. This path is as follows: ground, contact 12, contact 18, restored off-normal spring contact 32, motor magnet interrupter spring contact 41, contact 20, motor magnet 40, and negative battery. Since the interrupter spring contact 41 is now serially connected in the operating path of motor magnet 40, motor magnet 40 operates self-interruptedly and steps the switch wiper of switch 42 around to its normal position. When switch 42 is at normal, its off-normal spring contact 32 operates and prevents any further stepping.

A similar circuit exists for motor magnet 45. This path is as follows: ground, contact 22, restored off-normal spring contact 44, motor magnet interrupter spring contact 46, motor magnet 45, and battery. Over this path motor magnet 45 operates in a self-interrupted manner and steps the switch wiper of switch 43 to its normal position. When switch 43 is at normal, its off-normal spring contact 44 operates breaking the circuit to motor magnet 45 and prevents any further stepping. When both switches 42 and 43 have been returned to normal, off-normal springs 33 and 58 are operated and permit resistance battery to be impressed upon lead 5, thereby marking this regenerator idle to other equipment.

It will be noted that relays 25 and 35 are held operated during the return stepping of switch 42. Thus, a solid ground is kept on the switch wiper resulting in the neutralization of any charge on the storage capacitors.

Figure 2:
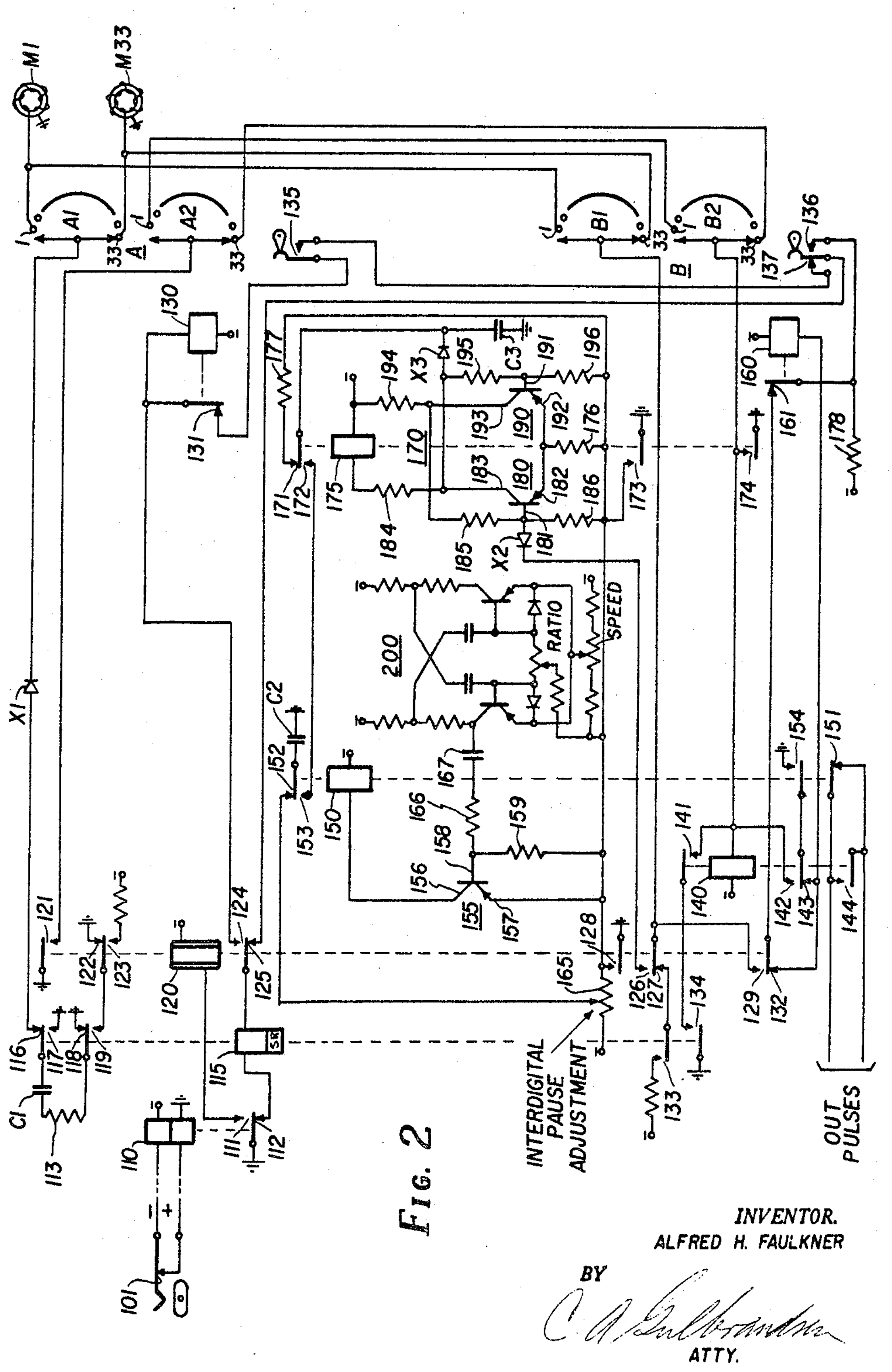
FIG. 2 is a schematic representation of an impulse regenerator using ferrite cores as storage elements.

Referring now to FIG. 2 of the drawings, which schematically shows an impulse regenerator using magnetic cores M1–M33 as storage elements, the functional similarity between this and the circuit of FIG. 1 is apparent. In brief, digital impulses are registered in the storage system by causing certain of the magnetic cores to have their states of magnetization reversed. As will be seen in the detailed description to follow, all of the cores are initially magnetically set in one direction. During an interdigital pause period a capacitor C1 is discharged through one of the cores to reverse its state of magnetization.

A detecting circuit 170, similar to the detecting circuit of FIG. 1, is arranged to be responsive to the reversed state of magnetization of the marked cores. This detecting circuit controls an output pulsing circuit which in turn controls a stepping switch B for sequentially connecting the individual cores to the detecting circuit.

A detailed description of the operation of this regenerator follows. For simplicity, the control circuit over which this regenerator is marked idle or busy to other equipment is not shown. Upon seizure relay 110 is operated over a line loop completed at contact 101 of the subscriber's telephone. Relay 110 in operating completes, at contact 111, an operating path for relay 120. As in the case of the circuit of FIG. 1, the process of receiving and registering a digit will be described first. Assuming that the subscriber dials the digit 2, as the dial is released contact 101 opens (for the first time) and relay 110 restores. Relay 110 in restoring completes a path at its contact 112 to relay 115 and to motor magnet 130. This path is from ground, contact 112, relay 115, contact 124, motor magnet 130, to battery. Over this path both relay 115 and motor magnet 130 operate. Relay 115 in operating completes a circuit at contacts 117 and 119 for the charging of capacitor C1. This circuit includes ground, contact 117, capacitor C1, resistor 113, contact 119, contact 123 of relay 120, which remains operated due to its slow-to-release feature, and resistance battery.

Switch A is a two-deck rotary switch having switch wipers A1 and A2 which are controlled by motor magnet 130. The bank contacts associated with wiper A1 are individually connected to one terminal of the single windings on respective magnetic cores M1 to M33. The other terminals of these windings are connected to ground. Magnetic cores M1 to M33 are preferably constructed of a ferrite material having substantially square loop hysteresis characteristics. It will be assumed at the outset that all of these cores have been magnetically set in one direction, i.e. as determined by the application of negative potential to the terminal of the core winding connected to the bank contacts of switch A. Rotary switch A is an indirectly stepped switch, that is wipers A1 and A2 are not stepped on the operation of motor magnet 130, but on its restoration.

As the dial continues to move toward its normal position contact 101 recloses and reoperates relay 110. Relay 110 in reoperating breaks, at contact 112, the operating path to relay 115 and motor magnet 130. Motor magnet 130 restores, stepping switch wipers A1 and A2 to their respective first bank contacts, but relay 115 remains operated due to its slow-to-release feature. Contact 101 reopens (for the second and final time) again restoring relay 110 which reoperates motor magnet 130. Contact 101 recloses and remains closed until the next digit is dialed. Relay 110 reoperates and motor magnet 130 restores, stepping switch wipers A1 and A2 to their respective second bank contacts.

During incoming interdigital pauses relay 115 restores after the passage of its slow-to-release time. Relay 115 in restoring connects, at contacts 116 and 118, capacitor C1 across magnetic core M2. It will be remembered that capacitor C1 was previously charged such that its right terminal was positive and its left terminal negative. The discharge circuit, now completed through the winding of magnetic core M2, results in core M2 being magnetically set in the opposite direction. This circuit covers ground, contact 118, resistor 113, capacitor C1, contact 116, diode X1, switch wiper A1 which is now resting on its second bank contact, magnetic core M2 and ground. Over this path capacitor C1 discharges through the winding of core M2. Succeeding wires interconnecting the second bank contacts of switch A with the corresponding second bank contacts of switch B, switch wiper B2 which is also resting on its bank contact 33, relay 140, and battery. At its contact 141 relay 140 completes a holding path to keep it operated, since its original operating path will be broken when switch wiper A2 is stepped responsive to incoming digital impulses. At contact 142, relay 140 prevents operation of motor magnet 160.

Relay 120, at contact 129, also completes a path from resistance battery to magnetic core M33. Since magnetic core M33 has previously been saturated and since negative battery tends to set up flux in the direction of present core saturation, the core winding presents a very low impedance. Thus, substantially ground potential appears on wiper B1. This path is over battery, resistance 178, interrupter spring 161 of motor magnet 160, contact 129, switch wiper B1 of switch B, one of the connecting wires joining the respective first contact banks of switches A and B, the winding of magnetic core M33, and ground. At contact 126, relay 120 connects the input diode X2 of detecting circuit 170 to switch wiper B1, thus impressing the ground potential thereon on diode X2.

Detecting circuit 170 comprises a pair of transistors 180 and 190 connected as a conventional trigger. A relay 175 is connected in the output circuit of transistor 180 and operates whenever this transistor is rendered conductive. Upon the simultaneous application of ground, via contacts 128, to emitters 182 and 192 of transistors 180 and 190 respectively, and ground, via contact 126, to diode X2 which is connected to base electrode 181 of transistor 180, transistor 190 becomes conductive. This conductive path extends over ground, contact 128, common emitter resistor 176, emitter 192 and collector 193 of transistor 190, resistor 194, and battery. When either transistor 180 or 190 conducts, it prevents conduction in the other transistor in the characteristic manner of bistable multivibrator circuits.

When relay 115 restores after the first digit (assumed to be a 2) has been received, it removes at contact 134 the holding ground for relay 140. Relay 140 restores and at contact 144 removes the shunt around pulsing contact 151. Relay 140 also prepares, at contact 143, an operating path to motor magnet 160 of switch B. It will be kept in mind that relay 150 is being continuously operated and restored by the action of pulse generator 200. With relay 140 restored, the next operation of relay 150 will simultaneously open the output pulse loop and complete the operating path to motor magnet 160. When relay 150 restores it recloses the output pulse loop and breaks the operating path to motor magnet 160. Motor magnet 160 of switch B is equipped with a special interrupter spring arrangement which is designed to make contact at 161 only after switch wipers B1 and B2 have come to rest on their succeeding bank contacts. Now, when motor magnet 160 restores, switch wipers B1 and B2, are stepped to their first bank contacts. Then interrupter spring contact 161 closes and places resistance battery in series with magnetic core M1. Since core M1 has previously been set, it presents a very low impedance to resistance battery and consequently, substantially ground potential appears on switch wiper B1. This ground potential on B1 is impressed, over a previously traced path, to base 181 of transistor 180 which is nonconductive at this time. Since transistor 180 is of the PNP type, this ground potential will not render it conductive.

Relay 150 pulses again and switch wiper B1 is stepped to its second bank contact which is connected to magnetic core M2. It will be recalled that magnetic core M2 had its state of magnetization reversed when capacitor C1 discharged through it. Now, when resistance battery is connected to core M2, it causes a reversal of its magnetic flux which is accompanied by a brief pulse of negative potential appearing at wiper B1. This negative pulse is impressed, through diode X2, on the base of transistor 180, and causes transistor 180 to conduct and transistor 190 to be cut-off. Upon conduction of transistor 180, relay 175 operates, and at contact 174, completes an operating path to relay 140. Relay 140, in operating, again shunts output pulsing contact 151 (terminating transmission of output pulses at 2, the digit originally received by the regenerator) and breaks the operating path to motor magnet 160.

Relay 175 in operating also prepares, at contact 172 a timing circuit for timing the pause periods between the output impulse series. It will be noted that collector 183 of transistor 180 is connected to the positive side of diode X3. Base 191 of transistor 190 is also connected, through a resistor 195, to this side of diode X3. The negative side of diode X3 is connected to ground via capacitor C3 on the one hand, and via contact 171 and resistor 177 on the other hand. Capacitor C3 is therefore substantially discharged. At this time attention should be directed to capacitor C2 which is intermittently connected to battery by contact 152 of pulsing relay 150. When relay 175 operates, it extends a connection via contact 172 from capacitor C3 (and the negative side of diode X3) to contact 153 of relay 150. Each time relay 150 operates, it disconnects capacitor C2 from battery and connects it via contact 153 to capacitor C3. Over this path a charge redistribution takes place between capacitors C2 and C3. This path is from ground, capacitor C2, contact 153, contact 172, capacitor C3, to ground. It can be seen that as relay 150 pulses, capacitor C2 is alternately charged from battery and partially discharged to capacitor C3. After a number of operations of relay 150, the potential appearing at the junction of diode X3 and capacitor C3, due to the charging of C3, equals the potential appearing at collector 183 of conducting transistor 180. Additional charge transfer to C3 unblocks diode X3 and a negative potential is impressed upon base 191 of transistor 190, causing this transistor to conduct. When transistor 190 conducts transistor 180 is rendered non-conductive and relay 175 is restored. Variable resistance 165, labeled interdigital pause on the drawing, is serially connected in capacitor C2's charging path. By adjustment of resistance 165, the outgoing interdigital pause period may be varied.

When relay 175 restores, it removes, at contact 174, the holding ground for relay 140. If in the meantime, no further digits have been received, switch wipers A1 and A2 will still be resting on their respective second bank contacts and the holding path consisting of ground, contact 121, wiper A2, wiper B2, relay 140, and battery will be present to hold relay 140 operated and prevent transmission of output impulses. If a digit is in the process of being stored, relay 115 will be energized and a holding path consisting of ground, contact 134, contact 141, relay 140, and battery will maintain relay 140 operated. Then during the succeeding incoming interdigital pause period, i.e., when relay 115 restores, all holding paths for relay 140 will be broken and the above described process of transmitting output pulses and simultaneously operating stepping switch B will be repeated.

Upon "switch through" after all received digits have been transmitted, relay 110 is restored. At contact 112 a previously mentioned operating path is completed and relay 115 operates in series with motor magnet 130. After its slow-to-release time, relay 120 restores breaking the circuit, at contact 124, to motor magnet 130 and placing relay 115 in series with resistance battery. This path includes ground, contact 112, relay 115, contact 125, restored off-normal spring 136, resistor 178, and battery. It will be noted that before the holding path to relay 140 is broken at contact 121 by restoration of relay 120, relay 115, at contact 134, places an additional holding path on relay 140. Relay 120 also de-energizes pulse generator 200 at contact 128.

The holding path for relay 115 junctions at resistor 178 to interrupter spring 161, contact 132, motor magnet 160 and battery. Over this path motor magnet 160 will operate in a self-interrupted manner and step switch wipers B1 and B2 back to their normal position. During this stepping operation, resistance battery is connected to wiper B1, thereby insuring that the cores will be magnetically set in the proper direction. This resistance battery is applied to wiper B1 via contact 133 and contact 127.

When the wipers of switch B have reached their normal position, off-normal spring contact 136 operates and breaks the operating path to motor magnet 160. Off-normal spring 137 then connects relay 115 in series with motor magnet 130. This path is over ground, contact 112, relay 115, contact 125, off-normal spring contact 135, interrupter spring contact 131, motor magnet 130, and battery. Over this path motor magnet 130 operates in a self-interrupted manner to step switch wipers A1 and A2 back to their normal position. When switch A has been restored to normal, off-normal spring contact 135 operates and restores motor magnet 130 and relay 115. When relay 115 restores it connects capacitor C1 across magnetic core M33 and restores relay 140. However, this capacitor has been previously discharged when relay 120 restored. The discharge path was over ground, contact 122, contact 119, resistor 113, capacitor C1, contact 117, and ground. Therefore, connecting capacitor C1 across core M33 does not affect the core's magnetic condition.

All of the transistors shown in the above circuits are of the PNP type but NPN types can readily be employed by one skilled in the art.

While the invention has been described with a certain degree of particularity, it is apparent that numerous modifications may be made without departing from the true spirit and scope of the invention as defined in the claims.

What is claimed is:

1. In combination, a detecting circuit, a plurality of storage devices, searching means for connecting successive ones of said storage devices, some of which have been marked in accordance with received digital information, to said detecting circuit, said detecting circuit including a pair of transistors in the form of a transistor trigger, said transistors being switched from a first state to a second state responsive to the markings on said marked storage devices, and capacitive timing means, effective when said trigger is in its second state, for switching said transistor trigger back to said first state.

2. The combination claimed in claim 1 wherein said searching means include a rotary switch having a wiper and a plurality of individual bank contacts, each of said storage devices connected to a corresponding one of said individual bank contacts and said wiper connected to said detecting circuit, said rotary switch operated, when said trigger is in said first state, to sequentially connect successive storage devices to said detecting circuit, said trigger assuming its second state responsive to the marking on one of said marked storage devices whereby said rotary switch is stopped and said capacitive timing means is actuated.

3. The combination claimed in claim 2 wherein said storage devices are electrolytic capacitors, the marked ones of said capacitors having a charge thereon.

4. The combination claimed in claim 2 wherein said storage devices are magnetic cores, having substantially square loop hysteresis characteristics, normally set in one of their two directions of saturation, and said marked cores being set in the other of said two directions of saturation.

5. An impulse regenerator comprising means for receiving a plurality of series of digital impulses, a plurality of storage devices, certain of which are marked in accordance with the numerical values of said received series, a detector circuit including a transistor trigger, searching means for sequentially connecting said storage devices to said detector circuit, a pulse generator arrangement, effective to simultaneously transmit digital impulses and operate said searching means with said detecting circuit being in its first state of conductivity, said detecting circuit assuming its second state of conductivity responsive to the markings on said marked storage devices, to render said pulse generator arrangement ineffective, and capacitive timing means, responsive to said detecting circuit being in its second state of conductivity, for returning said detecting circuit to its first state of conductivity, whereby said pulse generator arrangement is reactivated and said searching means reoperated after the lapse of a predetermined time.

6. An impulse regenerator as claimed in claim 5, wherein said pulse generator arrangement includes a pulse amplifier comprising a transistor trigger, a pulsing relay under control of said pulse amplifier, a source of timed voltage pulses continuously applied to said transistor trigger, said pulses being ineffective to switch said trigger, and means, operated with said detecting circuit in its first state of conductivity, whereby said trigger is repeatedly switched by said timed voltage pulses, and said output pulsing relay repeatedly operated in synchronism therewith.

References Cited by the Examiner

UNITED STATES PATENTS

| | | | |
|---|---|---|---|
| 2,708,267 | 5/1955 | Weidenhammer ----- | 340—174 |
| 3,082,409 | 3/1963 | Vogt ------------- | 340—173.2 |

BERNARD KONICK, *Primary Examiner.*

IRVING SRAGOW, *Examiner.*

T. W. FEARS, *Assistant Examiner.*